UNITED STATES PATENT OFFICE.

JOHN HOWE, OF ALLEGHENY, PENNSYLVANIA.

IMPROVEMENT IN MATCHES FOR LIGHTING CIGARS, &c.

Specification forming part of Letters Patent No. 128,626, dated July 2, 1872.

*To all whom it may concern:*

Be it known that I, JOHN HOWE, of Allegheny City, in the State of Pennsylvania, have invented and discovered a new Process for the Manufacture of Matches or Cigar and Pipe Lighters; and I do hereby declare the following to be a true and correct description of the ingredients composing and used in such manufacture, and the relative proportions of such ingredients constituting such process in their relation to each other:

Benzoin, one pound; myrrh, one pound; cascarilla bark, one pound; oil of nutmeg, one-fourth ounce; oil of cloves, one-fourth ounce; oil of musk, one-fourth ounce, or powdered musk; charcoal, two pounds; nitrate of potash, two pounds. The ingredients above mentioned to be thoroughly mixed into a thick paste by the use of a mucilage of gum tragacanth, the paste to be used on wood, wire, glass, or other suitable material.

What I claim as my invention, and desire to secure by Letters Patent, is—

The manufacture or preparation of a compound for matches, denominated "cigar or pipe lighters," composed of the within-described ingredients and in the proportions specified, for the uses and purposes herein set forth.

JOHN HOWE.

Witnesses:
EDWIN DAVIS,
FRED. EMRICH.